United States Patent [19]

Schunck et al.

[11] Patent Number: 5,229,433
[45] Date of Patent: Jul. 20, 1993

[54] LIQUID, RADIATION-CURABLE COATING COMPOSITION FOR THE COATING OF GLASS SURFACES

[75] Inventors: Stephan Schunck; Horst Hintze-Brüning, both of Münster, Fed. Rep. of Germany

[73] Assignee: BASF Lacke+Farben Aktiengesellschaft, Munster, Fed. Rep. of Germany

[21] Appl. No.: 775,975

[22] PCT Filed: Apr. 3, 1990

[86] PCT No.: PCT/EP90/00520
  § 371 Date: Nov. 28, 1991
  § 102(e) Date: Nov. 28, 1991

[87] PCT Pub. No.: WO90/13523
  PCT Pub. Date: Nov. 15, 1990

[30] Foreign Application Priority Data

Apr. 29, 1989 [DE] Fed. Rep. of Germany ....... 3914411

[51] Int. Cl.$^5$ .......................... C08F 2/50; C08F 283/04
[52] U.S. Cl. ...................... 522/96; 525/454; 525/455; 428/378; 428/423.1; 428/426
[58] Field of Search ................. 522/96, 77; 525/454, 525/455

[56] References Cited

U.S. PATENT DOCUMENTS

| | | | |
|---|---|---|---|
| 4,092,173 | 5/1978 | Novak et al. | 522/96 |
| 4,289,672 | 9/1981 | Friederich et al. | 209/29.2 TN |
| 4,472,019 | 9/1984 | Bishop et al. | 525/920 |
| 4,921,880 | 5/1990 | Lee et al. | 522/99 |
| 4,964,938 | 10/1990 | Bachmann et al. | 522/96 |

FOREIGN PATENT DOCUMENTS 0307102  3/1989  European Pat. Off. .

Primary Examiner—Marion E. McCamish
Assistant Examiner—Susan Berman
Attorney, Agent, or Firm—Frank G. Werner; Paul L. Marshall

[57] ABSTRACT

The present invention relates to a liquid, radiation-curable coating composition for the coating of glass surfaces which comprises A) 56 to 89% by weight of at least one diethylenically unsaturated polyurethane optionally containing urea groups,
B) 3 to 30% by weight of at least one ethylenically unsaturated monomer,
C) 0.5 to 8% by weight of at least one photoinitiator and
D) 0.05 to 6% by weight of an alkoxysilane, the sum total of the components A to D being 100% by weight in each case.

The coating composition uses

1.) one or more ethylenically unsaturated monomers containing carboxyl groups, optionally together with other ethylenically unsaturated monomers as the component B and
2.) an alkoxysilane containing epoxide groups as the component D.

These coating compositions are employed for the coating of glass surfaces, in particular of optical glass fibers, and are distinguished by good adhesion even under humid conditions.

9 Claims, No Drawings

LIQUID, RADIATION-CURABLE COATING COMPOSITION FOR THE COATING OF GLASS SURFACES

The present invention relates to a liquid, radiation-curable coating composition for the coating of glass surfaces, which comprises A) 56 to 89% by weight of at least one diethylenically unsaturated polyurethane optionally containing urea groups, B) 3 to 30% by weight of at least one ethylenically unsaturated monomer, C) 0.5 to 8% by weight of at least one photoinitiator and D) 0.05 to 6% by weight of an alkoxysilane, the sum total of the percentages by weight of the components A to D being 100% by weight in each case.

In addition, the present invention relates to a process for the coating of glass surfaces, in particular of optical glass fibers, using these radiation-curable coating compositions.

Optical glass fibers have been steadily gaining in importance in the communication sector as light conductors. For this purpose it is absolutely essential to protect the glass surface from humidity and wear. For this reason the glass fibers are coated, as soon as produced, by a protective paint film.

Thus, according to EP-A-114,982, for example, glass fibers are first provided with a coating of a buffer (primer) which is flexible but has low hardness and tenacity, followed by a radiation-curable topcoat of great hardness and tenacity The two-coat system is alleged to provide good protection for the glass fibers against mechanical stresses even at low temperatures The topcoat used in EP-B-114,982 consists of radiation-curable coating compositions based on a polyurethane having diethylenic terminal groups, a diethylenically unsaturated ester of a diglycidyl ether of a bisphenol and a monoethylenically unsaturated monomer, the glass transition temperature of the homopolymer produced from this monomer being above 55° C.

However, coatings of this nature on glass fibers have the important drawback of poor adhesion to the glass surface. Adhesion is impaired even further especially by humidity, in some circumstances to such an extent that total loss of adhesion to the glass surface occurs. The problem of poor adhesion of coatings to glass surfaces is known. For this reason, in order to improve adhesion, organosilanes are often added to the coatings as adhesion promoters. Thus, according to EP-B-33,043, for example, organosilanes are added as adhesion promoters to radiation-curable coating compositions based on vinyl monomers and reactive polymers (no polyurethanes), the presence of a thiirane ring in the vinyl monomers or the polymers being an essential part of the invention. Examples of suitable compounds cited are γ-aminopropyl-triethoxysilane, N,β-aminoethyl-γ-aminopropyltrimethoxy-silane and γ-glycidyloxypropyltrimethoxysilane. The document makes no reference to the problem of loss of adhesion of coatings to glass fibers under humid conditions.

JP-PS-45,138/85 of 08.10.1985 (corresponds to JP-OS 42,244/80 of 25.03.80) also discloses the use of organosilanes as adhesion promoters in radiation-curable glass fiber coatings, polymers comprising azide groups being used as the film-forming component. Examples of suitable silanes cited are γ-methacryloxypropyltri-methoxysilanes, γ-aminopropyltrimethoxysilane and γ-glycidyloxypropyltrimethoxysilane. However, incorporation of the azide groups in the polymers to increase the rate of curing is an essential part of the invention in JP-PS 45,138. This document likewise makes no reference to the problem of the effect of humidity on adhesion of coatings to glass fibers.

Furthermore, EP-A-149,741 discloses liquid, radiation-curable coatings for glass fibers which comprise, besides a radiation-curable, polyethylenically unsaturated polymeric compound, 0.5 to 5%, based on the coating composition, of a polyalkoxysilane. Suitable polyalkoxysilanes are those which comprise an organic substituent containing a single active amino or mercaptyl hydrogen also capable of reacting with the ethylenically unsaturated compounds in a Michael addition. An example of suitable silanes cited is γ-mercaptopropyl-trimethoxy-silane. EP-A-149,741 claims that only by using silanes of this type is it possible to improve adhesion even under humid conditions. In contrast, compounds normally employed as adhesion promoters, for example γ-amino-propyltriethoxysilane and N-β-(N-vinylbenzylaminopropyl)-trimethoxysilane, are according to EP-A-149,741 unsuitable for improving adhesion under humid conditions.

Finally, the as yet unpublished Application DE 3,840,644 discloses radiation-curable coating compositions for the coating of glass surfaces, which compositions comprise, besides a diethylenically unsaturated polyurethane and at least one ethylenically unsaturated monomer, 0.05 to 6.0% by weight of N-β-aminoethyl-γ-aminopropyltrimethoxysilane or β-aminopropyl-trimethoxy-silane or N-methyl-β-aminoprop vltrimethoxysilane or triamino-modified propyltrimethoxysilane. These radiation-curable coatings are distinguished by good adhesion of the coatings to the glass surfaces even under humid conditions.

The object of the present invention has been to provide radiation-curable coatings for the coating of glass surfaces, in particular of optical glass fibers, in which the resultant coating shows under humid conditions no loss or only a slight loss of adhesion when compared with a similar coating prepared freshly and tested immediately after curing.

In addition, the radiation-curable coating compositions must be clear in order to secure as low a damping loss as possible for the beamed intensity of informational data, when they are used as coating compositions for optical glass fibers.

The object forming the basis of the invention is achieved by a liquid, radiation-curable coating composition for the coating of glass surfaces, which comprises A) 56 to 89% by weight of at least one diethylenically unsaturated polyurethane optionally containing urea groups, B) 3 to 30% by weight of at least one ethylenically unsaturated monomer, C) 0.5 to 8% by weight of at least one photoinitiator and D) 0.05 to 6% by weight of an alkoxysilane, the sum total of the percentages by weight of the components A to D being 100% by weight in each case.

The coating composition uses

1.) one or more ethylenically unsaturated monomers containing carboxyl groups, optionally together with other ethylenically unsaturated monomers as the component B and 2.) an alkoxysilane containing epoxide groups as the component D.

The present invention furthermore relates to a process for coating a glass surface using the coating compositions according to the invention, to an optical glass fiber coated by the coating compositions according to the invention and to the use of these optical glass fibers as light conductors.

Faced with the very large number of organosilicon compounds known to act as adhesion promoters, it was surprising and not foreseeable that it is precisely by the combined utilization of alkoxysilanes containing epoxide groups and of ethylenically unsaturated monomers containing carboxyl groups, optionally in combination with other ethylenically unsaturated monomers as reactive thinners (component B), that adhesion of radiation-curable coating compositions based on unsaturated polyurethanes to glass surfaces is not at all or only slightly impaired by humid conditions, while when alkoxy-silanes containing epoxide groups, for example γ-glycidyloxypropyltrrmethoxysilane, are used alone, i.e. without ethylenically unsaturated monomers containing carboxyl groups as reactive thinners, adhesion is significantly impaired by humid conditions.

In addition, the radiation-curable coating compositions according to the invention have the advantage of being clear, thus securing as low a damping loss as possible for the beamed intensity of informational data, when used as coating compositions for optical glass fibers.

The coating composition according to the invention is further elucidated in the text below.

The diethylenically unsaturated polyurethanes (A) used as the film-forming component may be obtained by reacting a diisocyanate or polyisocyanate with a chain extender selected from the group of diols/polyols and/or diamines/polyamines and/or dithiols/polythiols and/or alkanolamines, and then reacting the residual free isocyanate groups with at least one hydroxyalkyl acrylate or hydroxyalkyl ester of other ethylenically unsaturated carboxylic acids.

The amounts of chain extender, diisocyanate or polyisocyanate and hydroxyalkyl ester of an ethylenically unsaturated carboxylic acid are chosen such that 1.) the equivalence ratio of the NCO groups to the reactive groups of the chain extender (hydroxyl, amino or mercaptyl groups) is between 3 : 1 and 1 : 2, preferably 2 : 1, and 2.) the OH groups of the hydroxyalkyl ester of ethylenically unsaturated carboxylic acids are present in a stoichiometric amount in respect of the still free isocyanate groups of the prepolymer obtained from isocyanate and chain extender.

It is furthermore possible to prepare the polyurethanes A by first reacting a part of the isocyanate groups of a diisocyanate or polyisocyanate with at least one hydroxyalkyl ester of an ethylenically unsaturated carboxylic acid and then reacting the residual isocyanate groups with a chain extender. Also in this case the amounts of chain extender, isocyanate and hydroxyalkyl ester of unsaturated carboxylic acids are chosen such that the equivalence ratio of the NCO groups to the reactive groups of the chain extender are between 3 : 1 and 1 : 2, preferably 2 : 1, and the equivalence ratio of the residual NCO groups to the OH groups of the hydroxy-alkyl ester are 1 : 1.

All intermediate forms of these two processes are of course also possible. For example, a part of the isocyanate groups of a diisocyanate may be first reacted with a diol, then a further part of the isocyanate groups may be reacted with the hydroxyalkyl ester of an ethylenically unsaturated carboxylic acid and finally the residual isocyanate groups may be reacted with a diamine.

These various methods of preparing the polyurethanes are known (cf. for example EP-A-204,161) and do not require a more detailed description.

Suitable compounds for the preparation of the polyurethanes A are aromatic, aliphatic and cycloaliphatic diisocyanates and polyisocyanates, for example 2,4-toluylene diisocyanate, 2,6-toluylene diisocyanate and mixtures thereof, 4,4'-diphenylmethane diisocyanate, m-phenylene diisocyanate, p-phenylene diisocyanate, 4,4'-diphenyl diisocyanate, 1,5-naphthalene diisocyanate, 1,4-naphthalene diisocyanate, 4,4'-toluidine diisocyanate and xylylene diisocyanate, as well as substituted aromatic systems, for example dianisidine diisocyanates, 4,4'-diphenyl ether diisocyanates or chlorodiphenylene diiso-cyanates and higher-function aromatic isocyanates, for example 1,3,5-triisocyanatobenzene, 4,4',4''-triiso-cyanatotriphenylmethane, 2,4,6-triisocyanatotoluene and 4,4'-diphenyldimethylmethane-2,2',5,5'-tetraisocyanate; cycloaliphatic isocyanates, for example 1,3-cyclopentane diisocyanate, 1,4-cyclohexane diisocyanate, 1,2-cyclohexane diisocyanate, 4,4'-methylene-bis(cyclohexyl isocyanate) and isophorone diisocyanate; aliphatic isocyanates, for example trimethylene, tetramethylene, pentamethylene, hexamethylene and trimethylhexamethylene 1,6-diisocyanate and tris-hexamethylene triisocyanate as well as the diisocyanates derived from dimeric fatty acids and described in EP-A-204,161, column 4, lines 42 to 49.

2,4-Toluylene and 2,6-toluylene diisocyanate, 4,4'-diphenylmethane diisocyanate, hexamethylene diisocyanate, isophorone diisocyanate and 4,4'-methylenebis(cyclohexyl isocyanate) are preferred.

Examples of suitable diols and polyols are ethylene glycol, 1,2-propylene glycol, 1,3-propylene glycol, butanediols, pentanediols, neopentyl glycol, hexanediols, 2-methyl-1,5-pentanediol, 2-ethyl-1,4-butanediol, dimethylolcyclohexane, glycerol, trimethylol-ethane, trimethylolpropane and trimethylolbutane, eryth-ritol, mesoerythritol, arabitol, adonitol, xylitol, mannitol, sorbitol, dulcitol, hexanetriol and (poly)-pentaerythritol; also monoethers such as diethylene glycol and dipropylene glycol as well as polyethers, adducts of the cited polyols and alkylene oxides. Examples of alkylene oxides which are suitable for a polyaddition to these polyols with formation of polyethers are ethylene oxide, propylene oxide, butylene oxide and styrene oxide. These polyaddition products are generally referred to as polyethers with terminal hydroxyl groups. They may be straight-chain or branched. Examples of such polyethers are polyoxyethylene glycols of a molecular weight of 200 to 4000, polyoxypropylene glycols of a molecular weight of 200 to 4000, polyoxy-tetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers may be likewise used. Suitable polyether polyols are those obtained by reacting such polyols as ethylene glycol, diethylene glycol, triethylene glycol, 1,4-butanediol, 1,3-butanediol, 1,6-hexanediol and mixtures thereof; glycerol trimethylolethane, trimethylolpropane, 1,2,6-hexanetriol, dipentaerlythritol, tripentaerythritol, polypentaerlyth-ritol, methyl glucosides and saccharose with alkylene oxides such as ethylene oxide, propylene oxide or mixtures thereof.

Examples of suitable polyether diols are also the polymerization products of tetrahydrofuran or butylene oxide. Compounds which may be further used are polyester polyols, preferably polyester diols which can be prepared, for example, by reacting the glycols already referred to with dicarboxylic acids, for example phthalic acid, isophthalic acid, hexahydrophthalic acid, adipic acid, azelaic acid, sebacic acid, maleic acid, glutaric acid, tetrachlorophthalic acid and hexachloroheptanedi-carboxylic acid. Instead of these acids it is also possible to use their anhydrides, where they exist.

Compounds which may be also used ar polycaprolactone diols and triols. These products may be obtained, for example, by reacting an ε-caprolactone with a diol. Such products are disclosed in US-PS 3,169,945.

The polylactonepolyols obtained by this reaction are distinguished by the presence of a terminal hydroxyl group and by recurring polyester moieties, derived from the lactone. These recurring molecular moieties can correspond to the formula $$-\overset{O}{\underset{\|}{C}}-(CHR)_n-CH_2O-$$

in which n is preferably 4 to 6 and the substituent is hydrogen, an alkyl radical, a cycloalkyl radical or an alkoxy radical, no substituent comprising more than 12 carbon atoms and the total number of carbon atoms in the substituent in the lactone ring not exceeding 12.

The lactone used as starting material may be any lactone or any combination of lactones, except that this lactone should comprise at least 6 carbon atoms in the ring, for example 6 to 8 carbon atoms, and at least 2 hydrogen substituents should be present on that carbon atom which is linked to the oxygen group of the ring. The lactone used as starting material can be represented by the following general formula:

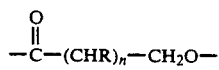

in which n and R have the meaning already defined. The lactones preferred according to the invention for the preparation of the polyester diols are those caprolactones in which n is 4. The lactone which is most preferred is the substituted ε-caprolactone in which n is 4 and all R substituents are hydrogen. This lactone is particularly preferred, because it is available in large amounts and furnishes coatings with excellent properties. In addition it is possible to use various other lactones either individually or in combination.

Examples of aliphatic diols which are suitable for the reaction with the lactone are the diols already cited above as suitable for reacting with the carboxylic acids.

Examples of suitable amines are ethylene diamine, tri-, tetra-, penta-, hexa-, hepta-, nona-, deca- and dodecamethylenediamine, 2,2,4- and 2,4,4-trimethyl-hexa-methylenediamine, propylenediamine as well as the corresponding polyalkylenediamines, for example polypropylene-diamine, polyetherdiamines of a molecular weight of 200 to 4000, for example polyoxyethylenediamine, polyoxy-propylenediamine, polyoxytetramethylenediamine, 1,3- and 1,4-butylenediamine, isophoronediamine, 1,2- and 1,4-diaminocyclohexane, 4,4'-diaminodicyclohexylmethane, bis(3-methyl-4-aminocyclohexyl)methane, 2,2-bis(4-amino-cyclohexyl)propane, 4,7-dioxadecane-1,10-diamine, 4,9-dioxadodecane-1,12-diamine, 7-methyl-4,10-dioxatridecane-1,13-diamine, nitriletris(ethanamine), ethanolamine, propanolamine, N-(2-aminoethyl)ethanol, polyetherpoly-amines,bis(3-aminopropyl)methylamine, 3-amino-1-(methyl-amino)propane, 3-amino-1-(cyclohexylamino)-propane, N-(2-hydroxyethyl)ethylenediamine, tris(2-aminoethyl)amine as well as polyamines of the formula $H_2N-(R_2-NH)_n-R_1-NH_2$, in which n is an integer between 1 and 6, preferably between 1 and 3. $R_1$ and $R_2$ are identical or different alkylene groups or cycloalkylene groups or ether groups comprising alkylene groups of 2-6, preferably 2-4 carbon atoms. Examples of such polyalkylenepolyamines are diethylene-triamine, triethylenetetramine, tetraethylenepentamine, dipropylenetriamine, tripropylenetetramine, tetrapro-pylenepentamine and dibutylene triamine.

Compounds which are suitable for use as chain extenders are also dithiols and polythiols, for example dithioethylene glycol, 1,2-propanedithiol, 1,3-propanedithiol, butanedithiols, pentanedithiols, hexanedithiols as well as other compounds of the cited diols and polyols comprising the S-H group.

Compounds which are suitable for introducing ethylenically unsaturated groups into the polyurethane are hydroxyalkyl esters of ethylenically unsaturated carboxylic acids, for example hydroxyethyl acrylate, hydroxypropyl acrylate, hydroxybutyl acrylate, hydroxyamyl acrylate, hydroxyhexyl acrylate, hydroxyoctyl acrylate as well as the corresponding hydroxyalkyl methacrylates, fumarates, maleates, itaconates, crotonates and isocrotonates.

The unsaturated polyurethane is employed in the coating compositions in an amount of 56 to 89% by weight.

In addition to the polyurethane A just described, the coating composition according to the invention also comprises 3 to 30% by weight of at least one ethylenically unsaturated monomer B. It is an essential part of the invention that at least a part, preferably 50 to 100% by weight, of the component B consists of one or more ethylenically unsaturated monomers containing carboxyl groups. Other ethylenically unsaturated monomers may be optionally used with this monomer or these monomers containing carboxyl groups, the amount of these monomers being chosen such that the total amount of the component B is 3 to 30% by weight. Particularly preferred coating compositions are obtained when the coating composition comprises 5 to 18% by weight, based on the total weight of the coating composition, of one or more ethylenically unsaturated monomers containing carboxyl groups. Other ethylenically unsaturated monomers may of course be also added in this case, the amount of these monomers being chosen such that the total content of ethylenically unsaturated monomers (component B) is not more than 30% by weight.

Examples of ethylenically unsaturated monomers containing carboxyl groups, suitable as the component B, are the β-carboxyethyl acrylate of the formula (I)

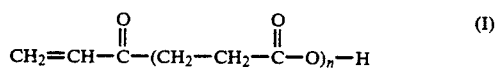

in which n=1 on average, acrylic acid, methacrylic acid, fumaric acid, maleic acid, undecenic acid, crotonic acid, isocrotonic acid and cinnamic acid.

If acrylic acid is used as the monomer containing carboxyl groups, then the acrylic acid is preferably used in combination with another monomer containing carboxyl groups.

The compound preferably used is the β-carboxyethyl acrylate of the formula (I), in which n=1 on average.

Examples of monomers which may be optionally used in conjunction with the monomer or monomers containing carboxyl groups, are ethoxyethoxyethyl acrylate, N-vinylpyrrolidone, phenoxyethyl acrylate, dimethylamino-ethyl acrylate, hydroxyethyl acrylate, butoxyethyl acrylate, isobornyl acrylate, dimethylacrylamide and dicyclopentyl acrylate In addition, suitable compounds are diacrylates and polyacrylates, for example butanediol diacrylate, trimethylolpropane diacrylate and triacrylate, pentaerythritol diacrylate as well as the long-chain straight-chain diacrylates of a molecular weight of 400 to 4000, preferably 600 to 2500, disclosed in EP-A-250,631. The two acrylate groups, for example, may be separated by a polyoxybutylene structure. In addition, 1,12-dodecyl diacrylate and the reaction product of 2 mol of acrylic acid with one mol of a dimeric fatty alcohol which generally has 36 carbon atoms, may be also used.

Mixtures of the monomers just described are also suitable.

Compounds which are suitable for combination with the monomer containing carboxyl groups are preferably N-vinylpyrrolidone, phenoxyethyl acrylate, trimethylol-propane triacrylate, isobornyl acrylate as well as mixtures of these monomers.

The photoinitiator used in the coating compositions according to the invention in an amount from 0.5 to 8% by weight, preferably 2 to 5% by weight, varies with the radiation employed for the curing of the coating compositions (UV radiation, electron beam, visible light). The coating compositions according to the invention are preferably cured by UV radiation. The photo-initiators usually used in this case are based on ketones, for example acetophenone, benzophenone, diethoxyacetophenone, m-chloroacetophenone, propiophenone, benzoin, benzil, benzil dimethyl ketal, anthraquinone, thioxanthone and thioxanthone derivatives as well as mixtures of various photoinitiators.

The coating compositions comprise as a further component according to the invention 0.05 to 6.0% by weight, preferably 1.2 to 2.0% by weight, of an alkoxysilane containing epoxide groups. The alkoxysilanes preferably used are 2-(3,4-epoxycyclohexyl)ethyltriethoxysilane, γ-glycidyloxypropyltrimethoxysilane and 3,4-epoxybutylt-riethoxysilane. These alkoxysilanes are commercial products and need not therefore be elucidated in greater detail.

The coating compositions according to the invention may in addition optionally comprise the usual auxiliaries and additives in the usual amounts, preferably 0.05 to 10% by weight, based on the weight of the coating composition. Examples of such substances are flow control agents and plasticizers. The coating compositions may be applied to the glass surface by known application methods, for example spraying, rolling, flow coating, dipping, blade coating or brushing.

The curing of the paint films is carried out by radiation, preferably by UV radiation. The equipment and conditions for these curing techniques are known from the literature (cf. for example R. Holmes, U.V. and E.B. Curing Formulations for Printing Inks, Coatings and Paints, SITA Technology, Academic Press, London, United Kingdom 1984) and do not require a more detailed description.

The present invention also relates to a process for the coating of a glass surface, in which
I.) a radiation-curable coating composition is applied, which comprises
  A) 56 to 89% by weight of at least one diethylenically unsaturated polyurethane optionally containing urea groups,
  B) 3 to 30% by weight of at least one ethylenically unsaturated monomer,
  C) 0.5 to 8% by weight of at least one photoinitiator and
  D) 0.05 to 6% by weight of an alkoxysilane, the sum total of the components A to D being 100% by weight in each case;
II.) the coating composition is cured by UV radiation or an electron beam.

The process comprises using
1.) one or more ethylenically unsaturated monomers containing carboxyl groups, optionally together with other ethylenically unsaturated monomers as the components B, and
2.) an alkoxysilane containing epoxide groups as the component D.

For a more detailed description of the coating composition employed in the process according to the composition and of the way of performing this process pages 6 to 16 of this text should be referred to.

The process according to the invention is particularly suited for the coating of optical glass fibers It is particularly important in the use of the optical glass fibers as light conductors that the coating compositions applied to protect the surface adhere well to the glass fiber surface even under humid conditions. Loss of adhesion of the coating under humid conditions—which cannot be avoided when the glass fibers are used as light conductors—(for example the glass fibers lie in the open at coupling stations) leads to coating defects on the glass fiber surface. This unprotected surface can then be very easily damaged, for example by particles of dust, which causes loss of optical properties. However, it is precisely by means of the process according to the invention and by the coating compositions according to the invention that it is possible to avoid these drawbacks and provide coatings with excellent adhesion even under humid conditions.

In this process the coating compositions according to the invention can be applied either as a one-coat coating or as a primer for a two-coat coating on the glass fibers. In the case of the two-coat coatings, suitable topcoats are disclosed, for example, in EP-B-114,982.

The invention is further elucidated in the examples below All parts and percentages are parts and percentages by weight, unless expressly stated otherwise.

EXAMPLE 1 (Comparison)

A radiation-curable coating composition which consists of 75.8 parts of an unsaturated polyurethane, 9.2 parts of trimethylolpropane triacrylate, 12 parts of phenoxyethyl acrylate, 0.5 part of benzil dimethyl ketal and 2.5 parts of benzophenone is prepared by known methods (cf. for example EP-B-114,982), in that 4 mol of 4,4'-methylenebis(cyclohexyl isocyanate) are first reacted with 2 mol of polyoxypro-pylene glycol (molecular weight 1000) in the presence of trimethylolpropane triacrylate and phenoxyethyl acrylate The resultant intermediate is reacted with 2 mol of 2-hydroxyethyl acrylate and then with 1 mol of polyoxypropylenediamine (molecular weight 230). The photoinitiators are subsequently added to the mixture. Tesakrepp ® adhesive tape No. 4432 (width 19 mm) is affixed to the border of thoroughly cleaned (especially degreased) glass panels (width×length=98×151 mm) and the panels are blade-coated with the coating composition (dry film thickness 180 μm).

Curing is carried out using UV radiation equipment comprising two mercury medium-pressure light sources each of 80 W/cm output at a conveyor speed of 40 m/minute in 2 passes at half output (=40 W/cm).

The radiation dose applied is 0.08 J/cm² (measured with the dosimeter UVICURE, system EIT from Eltosch).

Adhesion is tested immediately afterwards as follows:
The start of the film is carefully loosened from the glass with a blade.
A wire loop is affixed to the loosened part of the film with adhesive tape.
A spring balance is suspended on the loop and the film is detached by pulling at a right angle to the panel at a speed as constant as possible.
The force required to detach the film is measured in grams on the balance scale.

Evaluation of the adhesion test is carried out by taking an average of the values obtained in duplicate testing and by verifying the reproducibility of satisfactory (i.e. high) adhesion values by several replicate tests.

The result of the adhesion test is shown in Table 2.

Apart from the performed adhesion test it is also possible to use the roller peeling test according to DIN 5289, but this test was not carried out.

To test adhesion under humid conditions, the glass panels are in addition stored immediately after curing for 12 hours in suitable humidity chambers with a defined humidity of 90% relative humidity (r.h.) (corresponding to DIN 50005) at room temperature (25° C.).

The pull-off test using the spring balance is carried out immediately at the end of the exposure in the same manner as the adhesion test immediately after irradiation.

Evaluation of the adhesion test is in this case also carried out by taking an average of the values obtained in duplicate testing. At satisfactory (high) adhesion values at least two replicate measurements are carried out to verify reproducibility.

The result of this test is also shown in Table 2.

This technique of testing adhesion to windowpane glass provides a laboratory method which furnishes good, reliable results. This technique is also performed by glass fiber manufacturers, since it yields practical values which are in excellent agreement with the adhesion values on optical glass fiber (typical thickness of the fiber 125 μm).

EXAMPLE 2(COMPARISON)

A radiation-curable coating composition based on the unsaturated polyurethane is prepared in the same manner as in Comparison Example 1, except that the coating composition in Comparison Example 2 additionally contains 2 parts by weight of γ-glycidyloxypro-pyltrimethoxysilane.

This coating composition is blade-coated onto glass panels in the same manner as in Comparison Example 1 (dry film thickness 180 μm) and cured with the aid of a medium-pressure mercury vapor lamp (dose output also 0.08 J/cm²). Adhesion of the coating is measured as described in Comparison Example 1 immediately after curing of the coating composition and after 12 hours' storage at 90% relative humidity at room temperature. The results are shown in Table 2.

EXAMPLE 3 (COMPARISON)

A radiation-curable coating composition based on the unsaturated polyurethane is prepared in the same manner as in Comparison Example 1, except that instead of 12 parts of phenoxyethyl acrylate, 12 parts of β-carboxy-ethyl acrylate of the formula $$CH_2=CH-\overset{O}{\underset{\|}{C}}-O-(CH_2-CH_2-\overset{O}{\underset{\|}{C}}-O)_{\overline{n}}H$$

in which n=1 on average (commercial product SIPOMER B-CEA from ALCOLAC) are used.

The results of the adhesion test are shown in Table 2.

EXAMPLE 4

A radiation-curable coating composition based on the unsaturated polyurethane and β-carboxyethyl acrylate is prepared in the same manner as in Example 3, except that the coating composition additionally contains 2 parts of γ-glycidyloxypropyltrimethoxysilane.

The results of the adhesion test are shown in Table 2.

EXAMPLE 5

A radiation-curable coating composition is prepared in the same manner as in Example 3, except that the coating composition additionally contains 2 parts of 2-(3,4-epoxycyclohexyl)ethyltriethoxysilane.

The results of the adhesion test are shown in Table 2.

EXAMPLE 6 (Comparison)

A radiation-curable coating composition is prepared in the same manner as in Example 3, except that the coating composition additionally contains 2 parts of N-β-aminoethyl-γ-aminopropyltrimethoxysilane.

The results of the adhesion test are shown in Table 2.

EXAMPLE 7 (Comparison)

A radiation-curable coating composition based on the unsaturated polyurethane is prepared in the same manner as in Example 1, except that instead of 12 parts of phenoxyethyl acrylate 12 parts of acrylic acid are used. The results of the adhesion test are shown in Table 2.

EXAMPLE 8

A radiation-curable coating composition is prepared in the same manner as in Example 7, except that the composition additionally contains 2 parts by weight of γ-glycidyloxypropyltrimethoxysilane.

TABLE 1

| | Formulation of the coating compositions | | | | | | | |
|---|---|---|---|---|---|---|---|---|
| Example | 1 | 2 | 3 | 4 | 5 | 6 | 7 | 8 |
| Unsaturated polyurethane[1] | 75.8 | 75.8 | 75.8 | 75.8 | 75.8 | 75.8 | 75.8 | 75.8 |

TABLE 1-continued

| | Formulation of the coating compositions | | | | | | | |
|---|---|---|---|---|---|---|---|---|
| Example | 1 | 2 | 3 | 4 | 5 | 6 | 7 | 8 |
| Trimethylolpropane triacrylate | 9.2 | 9.2 | 9.2 | 9.2 | 9.2 | 9.2 | 9.2 | 9.2 |
| Phenoxyethyl acrylate | 12 | 12 | — | — | — | — | — | — |
| β-Carboxyethyl acrylate | — | — | 12 | 12 | 12 | 12 | — | — |
| Acrylic acid | — | — | — | — | — | — | 12 | 12 |
| Benzil dimethyl ketal | 0.5 | 0.5 | 0.5 | 0.5 | 0.5 | 0.5 | 0.5 | 0.5 |
| Benzophenone | 2.5 | 2.5 | 2.5 | 2.5 | 2.5 | 2.5 | 2.5 | 2.5 |
| Alkoxysilane 1[2)] | — | 2.0 | — | 2.0 | — | — | — | 2.0 |
| Alkoxysilane 2[3)] | — | — | — | — | 2.0 | — | — | — |
| Alkoxysilane 3[4)] | — | — | — | — | — | 2.0 | — | — |

Key to Table 1
[1)] The preparation of the polyurethane is described in Example 1.
[2)] γ-Glycidyloxypropyltrimethoxysilane
[3)] 2-(3,4-Epoxycyclohexyl)ethyltriethoxysilane
[4)] N-β-Aminoethyl-γ-aminopropyltrimethoxysilane

TABLE 2

Results of the adhesion test

| Example | Adhesion promoter (D) | Adhesion after curing (kg) | Adhesion 12 hours after curing, 90% r.h. (kg) |
|---|---|---|---|
| 1 | — | 1000–1100 | 25 |
| 2 | γ-glycidyloxypropyltrimethoxysilane | 1000–1100 | 50–100 |
| 3 | — | 1100–1200 | 20–50 |
| 4 | γ-glycidyloxypropyltrimethoxysilane | 1200–1400 | 800–850 |
| 5 | 2-(3,4-epoxycyclohexyl)ethyltriethoxysilane | 1200–1400 | 800–850 |
| 6 | N-β-aminoethyl-γ-aminopropyltrimethoxysilane[1)] | 1000–1200 | 850–950 |
| 7 | — | 1000–1100 | 50–100 |
| 8 | γ-glycidyloxypropyltrimethoxysilane | 1000–1200 | 800–850 |

[1)] coating composition turbid

Examples 1–8 indicate that if alkoxysilanes containing epoxide groups are used in combination with ethylenically unsaturated monomers containing carboxyl groups as one component of the reactive thinner (Examples 4, 5, 8), the coating compositions obtained are clear and furnish coatings which show under humid conditions no loss or only a very slight loss of adhesion; on the other hand, if alkoxysilanes containing epoxide groups are used without at the same time using monomers containing carboxyl groups as reactive thinners (Example 2) and only if monomers containing carboxyl groups as reactive thinners without being combined with alkoxysilanes containing epoxide groups (Examples 3 and 7) are used at the same time, a considerable loss of adhesion under humid conditions can be observed. It is true that using monomers containing carboxyl groups a reactive thinners at the same time in combination with other known adhesion promoters, for example alkoxysilanes containing amino groups, also shows only a very slight loss or no loss of adhesion under humid conditions, but these coating compositions are turbid and therefore not suited for the coating of optical glass fibers (Example 6).

We claim:
1. A liquid, radiation-curable coating composition for the coating of glass surfaces, which comprises
A) 56 to 89% by weight of at least one diethylenically unsaturated polyurethane,
B) 3 to 30% by weight of ethylenically unsaturated monomer comprising at lest one ethylenically unsaturated monomer containing carboxyl functionality,
C) 0.5 to 8% by weight of at least one photoinitiator and
D) 0.05 to 6% by weight of an alkoxysilane containing episode functionality,
the sum total of the percentages by weight of the components A to D being 100% by weight in each case.
2. The coating composition as claimed in claim 1, wherein the component D is used in an amount of 1.2 to 2.0% by weight, the sum total of the percentages by weigh of the components A to D being 100% by weight in each case.
3. The coating composition as claimed in claim 1 or 2, wherein γ-glycidyloxypropyltrimethoxysilane or 2-(3,4-epoxycyclohexyl) ethyltriethoxysilane or 3,4-epoxybutyltriethoxysilane is used as the component D.
4. The coating composition as claimed in claim 1, wherein 50 to 100% by weight of the component B consist of one or more ethylenically unsaturated monomers containing carboxyl groups.
5. The coating composition as claimed in claim 1, wherein the coating composition comprises 5 to 18% by weight, based on the total weight of the coating composition, of one or more esthetically unsaturated monomers containing carboxyl groups, the total amount of the monomers, based on the total weight of the coating composition, not exceeding 30% by weight.
6. The coating composition as claimed in claim 1, wherein a β-carboxy-ethyl acrylate of the formula (I)

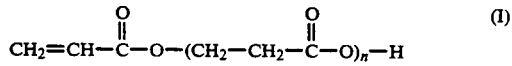

in which n=1 on average is used as at least a part of the component B.
7. The coating composition as claimed in claim 1 wherein component B also comprises one or more other ethylenically unsaturated monomers.
8. The coating composition as claimed in claim 5 wherein the coating composition also comprises one or more other ethylenically unsaturated monomers.
9. The coating composition as claimed in claim 1 wherein the diethylenically unsaturated polyurethane contains urea groups.

* * * * *